US011521430B2

(12) United States Patent
Tran

(10) Patent No.: US 11,521,430 B2
(45) Date of Patent: Dec. 6, 2022

(54) SYSTEM AND METHOD FOR MONITORING A TURBOMACHINE WITH ANOMALY DETECTION CORRECTED BY A WEAR FACTOR

(71) Applicant: SAFRAN AIRCRAFT ENGINES, Paris (FR)

(72) Inventor: Hang-Mi Tran, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 353 days.

(21) Appl. No.: 16/609,827

(22) PCT Filed: May 2, 2018

(86) PCT No.: PCT/FR2018/051085
§ 371 (c)(1),
(2) Date: Oct. 31, 2019

(87) PCT Pub. No.: WO2018/202991
PCT Pub. Date: Nov. 8, 2018

(65) Prior Publication Data
US 2020/0066061 A1    Feb. 27, 2020

(30) Foreign Application Priority Data

May 5, 2017  (FR) ...................... 17 54001

(51) Int. Cl.
*G07C 5/00*    (2006.01)
*F02C 7/00*    (2006.01)
*G08B 21/18*   (2006.01)

(52) U.S. Cl.
CPC ................ *G07C 5/006* (2013.01); *F02C 7/00* (2013.01); *G08B 21/182* (2013.01); *F05D 2220/323* (2013.01); *F05D 2260/80* (2013.01)

(58) Field of Classification Search
CPC ....................................................... G07C 5/006
See application file for complete search history.

(56) References Cited

U.S. PATENT DOCUMENTS 8,050,842 B2 * 11/2011 Iraudo .................... B64D 43/00
                                                      701/8
8,755,985 B2 *  6/2014 Vieira ..................... F01D 19/00
                                                      701/31.4
(Continued)

FOREIGN PATENT DOCUMENTS

EP       2006202 A1    12/2008
FR       2996254 A1     4/2014
WO    2015197944 A1    12/2015

OTHER PUBLICATIONS

Search Report issued in French Patent Application No. 17 54001 dated Jan. 23, 2018.
(Continued)

*Primary Examiner* — Michael A Berns
(74) *Attorney, Agent, or Firm* — Pearne & Gordon LLP

(57) ABSTRACT

A system for monitoring the state of health of a monitored aircraft engine comprises an anomaly detection unit which analyses engine operating parameters and raises an alarm if a result of the analysis of one of the engine operating parameters crosses a threshold, the alarm being associated with a probability of a given type of engine damage occurring. The system further comprises an engine operating conditions monitoring unit which determines a state of wear of the engine, and an alarm corroboration unit which weights the said probability of occurrence by the determined state of wear. The invention is applicable to the preventive maintenance of turbomachines.

10 Claims, 2 Drawing Sheets

(56) References Cited

U.S. PATENT DOCUMENTS

| | | | | |
|---|---|---|---|---|
| 10,147,245 B2* | 12/2018 | Coupard | ............... | B64D 31/06 |
| 2010/0317420 A1* | 12/2010 | Hoffberg | ............ | G06Q 30/0207 |
| | | | | 463/1 |
| 2020/0066061 A1* | 2/2020 | Tran | ...................... | G07C 5/006 |

OTHER PUBLICATIONS

International Search Report issued in Application No. PCT/FR2018/051085 dated Aug. 31, 2018.
Written Opinion issued in Application No. PCT/FR2018/051085 dated Aug. 31, 2018.

\* cited by examiner

SYSTEM AND METHOD FOR MONITORING A TURBOMACHINE WITH ANOMALY DETECTION CORRECTED BY A WEAR FACTOR

This is the National Stage application of PCT international application PCT/FR2018/051085, filed on May 2, 2018, which claims the priority of French Patent Application No. 17 54001 filed May 5, 2017, both of which are incorporated herein by reference in their entirety.

TECHNICAL FIELD

The field of the invention is that of health monitoring systems for a machine, such as an aircraft turbomachine. The invention more particularly relates to an automated decision aid system for making maintenance operations of an aircraft engine.

STATE OF PRIOR ART

Health monitoring of a machine aims at improving security and reliability thereof. As regards aircraft engines in particular, this observation aims at avoiding or limiting in-flight shutdown (IFSD), reducing flight delays and cancellations (D&C), and more particular facilitating engine maintenance preventively, by anticipating failures and identifying faulty or failing components.

For monitoring the health of an aircraft engine, different monitoring or anomaly detection devices are used to check that the different components of the engine are properly operating. There are for example an observation device for analysing the behaviour of the ignition process, another to analyse gas temperature, yet another one to detect filter clogging, and another to analyse oil and fuel consumption, etc.

Data generated by these detection and observation devices are received on the ground via flight reports and are utilised thereat by maintenance systems by means of health monitoring algorithms. These algorithms raise alerts when they detect an anomaly (signs of a breakdown or more generally a degradation). These alerts are then utilised on the ground by experts dedicated to fleet monitoring for them to check the operational capabilities of the engine as a function of the alerts raised.

The main principle of these algorithms is an approach by thresholding the observed variables which are raw physical data relating to the engine operation, coupled with a threshold exceedance confirmation step (anomaly confirmation) before raising an alarm. This approach, although simple, is quite performing if the risks of non-detection a real anomaly in the engine behaviour is desired to be limited to a minimum.

There are conventionally three threshold exceedance confirmation rules:

Type I: an integer k is set. If on the entire signal, at least k exceedances are noticed, then the alarm is raised;

Type II: an integer k is set. If there is a set of k successive measurements points beyond the threshold, then the alarm is raised;

Type III: two integers k and n are set, with k smaller than n. If there is a set of n successive measurements points among which at least k are beyond the threshold, then the alarm is raised.

Once an alarm is raised, an expert dedicated to fleet monitoring has to come and check the engine operational capabilities. This expert come more precisely to analyse the evolution of a number of operating parameters of the engine in order to confirm the signs of a breakdown, and thus avoid emitting false alarms. In case of doubt, an expert from the Research Bureau may be requested. If the presence of an anomaly is confirmed, the expert drafts a report called a Customer Notification Report (CNR) which contains the data considered, the analysis made as well as its maintenance recommendations. If the presence of an anomaly is not confirmed by the expert, he/she does not follow up with to the alarm. The alarm is thereby called a false alarm.

Thus, following the raising of an alarm as a consequence of a threshold exceedance confirmation, and before any maintenance action, the expert can be caused to ask the engine operating agency to download engine data not already received via the flight reports in order to be able to inspect the engine likely to have signs of a degradation. Such a downloading may not be able to be made quickly depending on the airplane availability.

Following the raising of an alarm, the confirmation thereof thus requires to make manual procedures based on data downloading and the expert analyses. These procedures have the drawback of non-negligible processing time and cost. The analysis of the expert dedicated to fleet monitoring is in any case necessary in case of detection of the signs of a degradation, including when it is finally only a false alarm.

DISCLOSURE OF THE INVENTION

The purpose of the invention is to make it possible for experts dedicated to fleet monitoring to be less called upon for following the detection of the signs of a degradation, resulting in a reduced cost for health monitoring without reducing reliability.

To that end, it provides a health monitoring system for an aircraft engine under observation, comprising an anomaly detection unit configured to analyse operating parameters of the engine and raise an alarm in case of threshold exceedance by an analysis result of one of the operating parameters of the engine, the alarm being associated with a probability of occurrence of a given degradation type of the engine. The system comprises an engine operating condition monitoring unit configured to determine an engine wear rate, and an alarm confirmation unit configured to weight said probability of occurrence with the determined wear rate.

Some preferred but not limiting aspects of this system are the following ones:

the anomaly detection unit is configured to raise an alarm if an analysis result of one of the operating parameters of the engine complies with a threshold exceedance confirmation rule, for example one of the aforementioned Type I, Type II or Type III rules;

the engine operating condition monitoring unit is configured to determine the age of the engine since it has been first operated and deduce therefrom a nominal mode wear rate, to determine the time spent by the engine under critical operating conditions since it has been first operated and deduce therefrom a degraded mode wear rate, and to deduce the engine wear rate by combining the degraded mode wear rate with the nominal mode wear rate;

the critical operating conditions comprises at least one operation among an operation outside a nominal temperature range, an operation outside a nominal hygrometry range, an operation outside a nominal pressure range and an operation in contact with corrosive products.

BRIEF DESCRIPTION OF THE DRAWINGS

Further aspects, purposes, advantages and characteristics of the invention will better appear upon reading the following detailed description of preferred embodiments thereof, given by way of non-limiting example, and made in reference to the appended drawings in which.

DETAILED DISCLOSURE OF PARTICULAR EMBODIMENTS

The invention generally provides a tool able to provide in an automated way information useful for a decision making related to maintenance operations of an aircraft engine.

Within this scope, the invention provides a health monitoring system for an aircraft engine which enables the number of false alarms to be decreased without modifying the anomaly detection rate (true alarms). To that end, the system is placed downstream of an anomaly detection unit which raises the alarms. Thus, generating new alarms is avoided, and the anomaly detection rate is not modified. The system thereby implements a correction of the alarms raised to favour these alarms when the engine is worn and thus likely to be degraded, and disfavour these alarms when the engine is not much worn and thus not much likely to be degraded.

Figure 1:
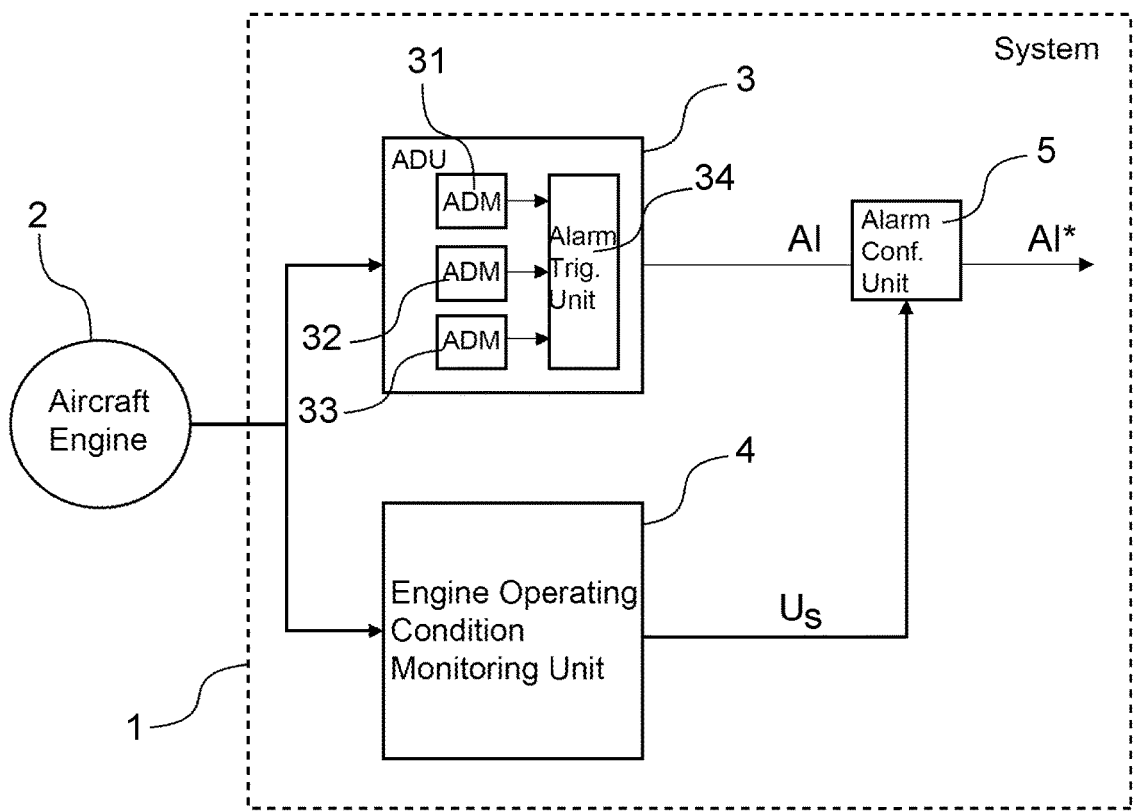
FIG. 1 schematically illustrates a health monitoring system for an aircraft engine according to a possible embodiment of the invention.

In reference to FIG. 1, the invention more particularly relates to a system 1 for monitoring the health of an aircraft engine 2. The system 1 comprises an anomaly detection unit 3 configured to analyse operating parameters of the engine 2 and raise an alarm Al in case of threshold exceedance by an analysis result of an operating parameter of the engine.

The anomaly detection unit 3 includes various anomaly detection modules 31, 32, 33. These modules receive operating parameters relating to different components of the engine, and are configured to determine indicators from these parameters and detect anomalies in these indicators. These indicators are thus called anomaly indicators.

The anomaly indicators produced by the modules 31, 32, 33 are calculation results, generally algorithm outputs, or results of statistical tests. These are for example outputs from health monitoring algorithms or syntheses or results of test analyses.

Typically, for observing the engines of airplane fleets, the measurements made during each flight are analysed by a fleet manager. In the present invention, these analyses are made by the anomaly detection modules 31, 32, 33 which implement for example rupture detection algorithms in the engine behaviour from flight to flight. There are several kinds of ruptures (sudden or progressive), several ways to notice them (long or short term), and about one hundred of signals to look at separately or in combination. Therefore, there are many anomaly detection modules (several thousands) which all provide, after each flight, their anomaly indicators, wherein each can be associated with a confidence indicator.

These anomaly indicators are provided to an alarm triggering unit 34. This unit 34 is configured to raise an alarm Al if the analysis result of one of the operating parameters of the engine is confirmed in that it complies with a threshold exceedance confirmation rule. It can be for example one of the aforementioned rules: type I (the threshold exceedance rule corresponds to the detection of a threshold exceedance during k operating cycles during the lifetime of the engine, k being a positive integer), type II (the threshold exceedance rule corresponds to the detection of a threshold exceedance during k successive operation cycles of the engine, k being a positive integer) or type III (the threshold exceedance rule corresponds to the detection of a threshold exceedance on k operating cycles among n successive operating cycles, k and n being positive integers, n being higher than k). Taking the example of a turbomachine, an operating cycle typically corresponds to a flight of the airplane with the turbomachine onboard.

An alarm Al raised by the alarm triggering unit 34 is associated with a probability of occurrence of a given degradation type of the engine, noted $P_{init}$.

According to the invention, the observing system 1 further comprises an engine operating condition monitoring unit 4 configured to determine a wear rate $U_s$ of the engine, as well as an alarm confirmation unit 5 configured to weight said probability of occurrence $P_{init}$ with the determined wear rate. The alarm confirmation unit thus raised a corrected alarm Al* corresponding to the probable occurrence of said given degradation type according to a corrected probability of occurrence $P_{corr} = P_{init} * U_s$.

For the sake of clarity, it will be noted that with a wear rate of 5% for example, the engine has still nearly its entire potential and there is no reason to suspect it to be degraded. On the contrary, with a wear rate of 95%, the engine is at the end of life, its remaining potential is very low and there is reason to suspect it to have degradations.

Figure 2:
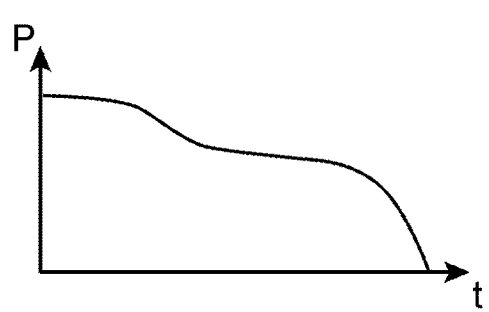
FIGS. 2 and 3 illustrate the impact of the wear of an aircraft engine on its potential during its lifetime respectively in a nominal mode and in a degraded mode.

The engine operating condition monitoring unit 4 can in particular be configured to determine the age of the engine since it has been first operated and deduce therefrom a nominal mode wear rate, i.e. corresponding to nominal operating conditions. In FIG. 2, an example of the evolution of the remaining potential P of an engine over time t has thus been represented, the engine being subjected to nominal operating conditions. Being expressed as a percentage of the initial potential of the engine, the remaining potential P enables the wear rate $U_s$ to be deduced according to $U_s = 100 - P$.

The engine operating condition monitoring unit 4 can for example be configured to determine the time spent by the engine under critical operating conditions since it has been first operated, and deduce therefrom a degraded mode wear rate, and determine the wear rate $U_s$ of the engine from the degraded mode wear rate and the nominal mode wear rate. The wear rate $U_s$ of the engine is for example determined by combining, for example by simply adding each other, the degraded mode wear rate with the nominal mode wear rate.

By way of example, the nominal mode wear rate and the degraded mode wear rate can be determined from measurements sensed by one or sensors, measurement signals relating to this or these sensors being then transmitted to the engine operating condition monitoring unit 4 in order to know the degradation state of the elements prone to wear.

Typically, this sensor type measures the local generic parameters relating to damage or wear of the component to which it is attached. Then, it makes a calculation and stores the result of this calculation as well as the associated history. Alternatively, this wear calculation can also be made by the unit 4 which collects the data and determines the wear rate from the measurement signals transmitted by the sensor(s).

Advantageously, data downloading from the sensor to the engine operating condition monitoring unit 4 is made by means of a wireless connection. Each sensor can thus be associated with a quantity to be measured, relating to the aircraft component prone to wear. Each of the sensors is able to deliver, over time, this measurement signal representative of the value of the associated quantity. These are physical quantities necessary to calculate wear. For example, such a quantity is a quantity with continuous values such as a bulk temperature of the component, a vibration amplitude undergone by the component, an elongation of the component, an ambient temperature at the vicinity of the component, a fluid (such as air, oil or fuel) flow rate, a fluid pressure or a speed of the turbomachine. According to another example, such a quantity is a quantity with discrete values, such as a flight phase, or an operating state of the turbomachine.

In one embodiment, the engine operating condition monitoring unit 4 estimates the degraded mode wear rate from measurement data relating to critical operating conditions sent by the sensor(s) of the observed component(s), that is when the observed components operate outside a nominal range of a given physical quantity. For example, if the nominal temperature range of a component is between 10° C. and 20° C., the unit 4 uses the data transmitted by the sensor in order to calculate the degraded mode wear rate based on the measurement data of the component to be observed when the same operates outside this nominal range. Analogously, the engine operating condition monitoring unit 4 can estimate the nominal mode wear rate from the data relating to nominal operating conditions sent by the sensor of the observed component, namely when the observed component operates in the nominal range of a given physical quantity. For example, if the nominal temperature range of a component is between 10° C. and 20° C., the unit 4 uses the data transmitted by the sensor in order to calculate the nominal mode wear rate based on the measurement data of the component to be observed corresponding to the operation of the component to be observed when the same operates inside this nominal range.

Time data can be deduced from the measurement data sensed by the sensor. For example, this time data can enable the utilisation time of the engine to be approximated from the measurement data, by comparing for example the measurement data to data corresponding to a utilisation state of the component. A temperature measurement sensed on a component can for example be compared with a temperature value range corresponding to a utilisation state of said component, the comparison enabling to deduce whether the component is in its utilisation state.

The utilisation of this time data associated with the measurement data related to critical operating conditions and to the measurement data relating to nominal operating conditions can also enable the degraded mode wear rate and the nominal mode wear rate to be respectively estimated. This estimation can be based on the comparison of the values of this data to predetermined values stored in the engine operating condition monitoring unit 4, the comparison enabling a percentage or an index representative of the wear to be evaluated.

As indicated above in the description, the wear rate $U_s$ can for example be determined by combining, for example by simply adding each other, the degraded mode wear rate with the nominal mode wear rate. This wear rate $U_s$ can also be based only on the degraded mode wear rate or the nominal mode wear rate.

Figure 3:
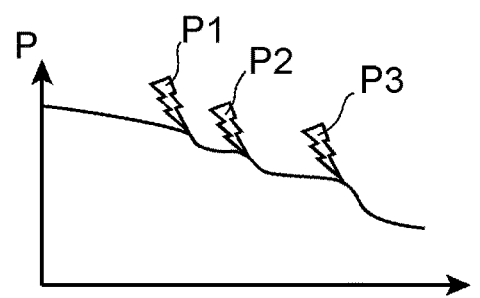

In FIG. 3, an example of evolution of the remaining potential P of an engine over time t has been thus represented, the engine being subjected to nominal operating conditions except for three periods where it is subjected to critical operating conditions P1, P2, P3 and where it is further degraded.

The nominal mode potential characterisation, definition of critical operating conditions and characterisation of their impact in terms of potential degradation are unique to each engine and its operating environment. The remaining potential P of an engine subjected to nominal operating conditions changes for example linearly or asymptotically over time t. If need be, tests can be made by conducting wanted degradations and by evaluating their impact on the engine potential.

By way of examples, for the turbomachine, either of the following critical operating conditions can be retained:
  an operation outside a nominal temperature range;
  an operation outside a nominal hygrometry range;
  an operation outside a nominal pressure range; and
  an operation in contact with corrosive products.

Figure 4:
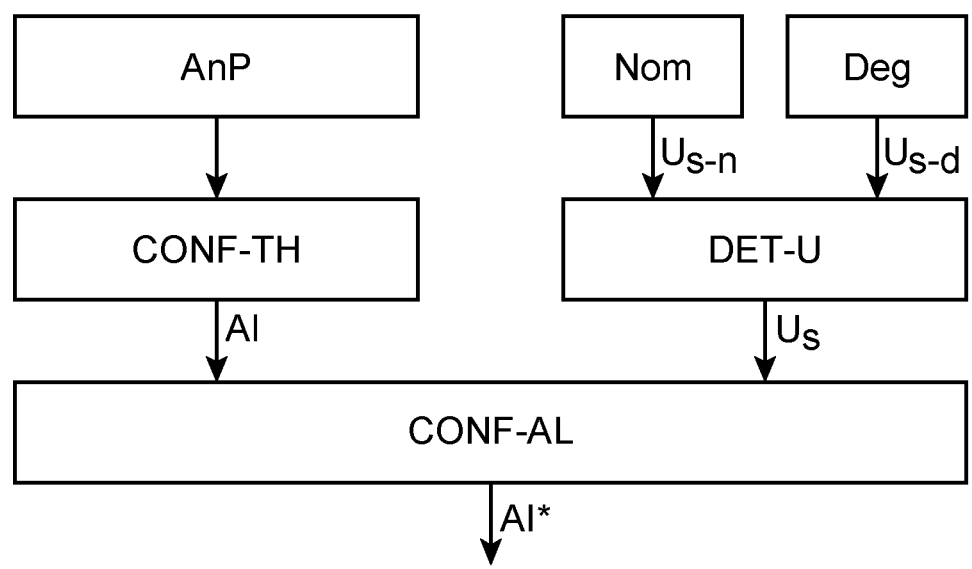
FIG. 4 schematically illustrates a decision aid method for the maintenance of an aircraft engine according to a possible embodiment of the invention.

The invention is not limited to the system as previously described, but also extends to a method for monitoring the health of an aircraft engine. In reference to FIG. 4, this method comprises an anomaly detection step which includes an "AnP" analysis of engine operating parameters and raising an alarm Al in case of threshold exceedance by an analysis result of one of the engine operating parameters, the alarm being associated with a probability of occurrence of a given degradation type of the engine. The alarm Al is typically raised after confirmation "CONF-TH" that a threshold exceedance rule is complied with.

The method further comprises a step of monitoring engine operating conditions to determine a wear rate Us of the engine, and an alarm confirmation step "CONF-AL" during which said probability of occurrence is weighted with the determined wear rate, thus providing a corrected alarm Al*.

The engine operating condition monitoring step implements an operation "Nom" of determining a nominal mode wear rate $U_{s-n}$ of the engine. It also comprises an operation "Deg" of determining the time spent by the engine under critical operating conditions since it has been first operated to deduce therefrom a degraded mode wear rate $U_{s-d}$, as well as an operation "DET-U" of determining the engine wear rate by adding the degraded mode wear rate to the nominal mode wear rate.

The invention also extends to a computer program product comprising code instructions for running the steps of the method according to the invention, when said program is run on a computer.

What is claimed is:

1. A health monitoring system for an aircraft engine, comprising:
    an anomaly detection unit configured to analyse operating parameters of the aircraft engine and raise an alarm in case of threshold exceedance by an analysis result of one of the operating parameters of the aircraft engine, the alarm being associated with a probability of occurrence of a given degradation type of the aircraft engine;
    an engine operating condition monitoring unit configured to determine an engine wear rate; and
    an alarm confirmation unit configured to weight said probability of occurrence with the determined engine wear rate.

2. The health monitoring system according to claim 1, wherein the anomaly detection unit is configured to raise an alarm if an analysis result of one of the operating parameters of the aircraft engine complies with a threshold exceedance confirmation rule.

3. The health monitoring system according to claim 2, wherein the threshold exceedance confidence rule corresponds to the detection of a threshold exceedance during k operating cycles during the lifetime of the aircraft engine, k being a positive integer.

4. The health monitoring system according to claim 2, wherein the threshold exceedance confidence rule corresponds to the detection of a threshold exceedance during k successive operating cycles of the aircraft engine, k being a positive integer.

5. The health monitoring system according to claim 2, wherein the threshold exceedance confidence rule corresponds to the detection of a threshold exceedance on k operating cycles among n successive operating cycles of the aircraft engine, k and n being positive integers, n being higher than k.

6. The health monitoring system according to claim 1, wherein the engine operating condition monitoring unit is configured to determine the age of the aircraft engine since the aircraft engine has been first operated and deduce therefrom a nominal mode wear rate, to determine the time spent by the aircraft engine under critical operating conditions since the aircraft engine has been first operated and deduce therefrom a degraded mode wear rate, and to deduce the engine wear rate by combining the degraded mode wear rate with the nominal mode wear rate.

7. The health monitoring system according to claim 6, wherein the critical operating conditions comprise at least one operation among an operation outside a nominal temperature range, an operation outside a nominal hygrometry range, an operation outside a nominal pressure range and an operation in contact with corrosive products.

8. The health monitoring system according to claim 1, wherein the aircraft engine is a turbomachine.

9. A method for monitoring the health of an aircraft engine, comprising:
   a step of detecting anomalies which includes an analysis of operating parameters of the aircraft engine and an alarm raising in case of threshold exceedance by an analysis result of one of the operating parameters of the aircraft engine, the alarm being associated with a probability of occurrence of a given degradation type of the aircraft engine,
   a step of monitoring operating conditions of the aircraft engine during which an engine wear rate is determined, and
   an alarm confirmation step during which said probability of occurrence is weighted with the determined engine wear rate.

10. A non-transitory computer-readable medium comprising program code instructions for executing the steps of the method according to claim 9, when said program code instructions are run on a computer.

* * * * *